United States Patent [19]

Camborde et al.

[11] Patent Number: 4,654,862
[45] Date of Patent: Mar. 31, 1987

[54] DIGITAL SIGNAL TRANSMISSION CABLE NOISE ANALYZER

[75] Inventors: Jean-Marc Camborde, Lannion; Marcel Schirlin, Puymirol; Jean-Claude Perrot, Plouaret, all of France

[73] Assignee: L'Etat Francais, France

[21] Appl. No.: 706,014

[22] Filed: Feb. 27, 1985

[30] Foreign Application Priority Data

Mar. 9, 1984 [FR] France ............................... 84 03790

[51] Int. Cl.⁴ .................. G01R 27/00; H04B 3/46
[52] U.S. Cl. .................................. 375/10; 375/76; 324/57 N
[58] Field of Search .............. 375/10, 76; 324/57 N, 324/77 A; 364/481, 486; 371/64; 370/13; 455/226; 358/155, 177; 179/170 E

[56] References Cited

U.S. PATENT DOCUMENTS

| | | | |
|---|---|---|---|
| 3,890,470 | 6/1975 | Allen | 324/57 N |
| 3,978,401 | 8/1976 | Lum | 324/57 N |
| 4,034,340 | 7/1977 | Sant' Agostino | 375/10 |
| 4,057,785 | 11/1977 | Furniss et al. | 340/825.06 |
| 4,074,201 | 2/1978 | Lennon | 364/481 |
| 4,185,242 | 1/1980 | Schaible | 455/226 |
| 4,305,150 | 12/1981 | Richmond et al. | 375/10 |
| 4,365,193 | 12/1982 | Bollero et al. | 324/77 A |

OTHER PUBLICATIONS

Soderberg "Automatic Transmission Measuring Equipment, ATME2 for International Telephone Circuits" pp. 21–28 Ericsson Review vol. 51, No. 7, 1974.
Stodart "Method of Testing PCM Encoders and Decoders by a Level at a Time Process" Electronic Letters pp. 36–38, vol. 7, No. 2, Jan. 28, 1971.
Harrison "Measuring Equipment for Data Transmission Channel" Philips Telecommunications Review, vol. 27, No. 1, Aug. 1967.

Primary Examiner—Robert L. Griffin
Assistant Examiner—Stephen Chin
Attorney, Agent, or Firm—Laff, Whitesel, Conte & Saret

[57] ABSTRACT

An analyzer for noise signals which are transmitted by a telephone pair in a telephone cable is connected to a digital transmission equalizer. A delimiting circuits delimits the binary stream generated by the threshold detector into data packets such that each stream is considered to be a unique packet as long as the stream does not comprise a predetermined number of zeros. At predetermined instants, writing is triggered into a random access data memory to store the contents of a schedule data register, of a storage register and of a frame unique word register. The time base also comprises an output connected to an incrementing input of an address counter and to an output connected to the zero reset input of storage register.

13 Claims, 47 Drawing Figures

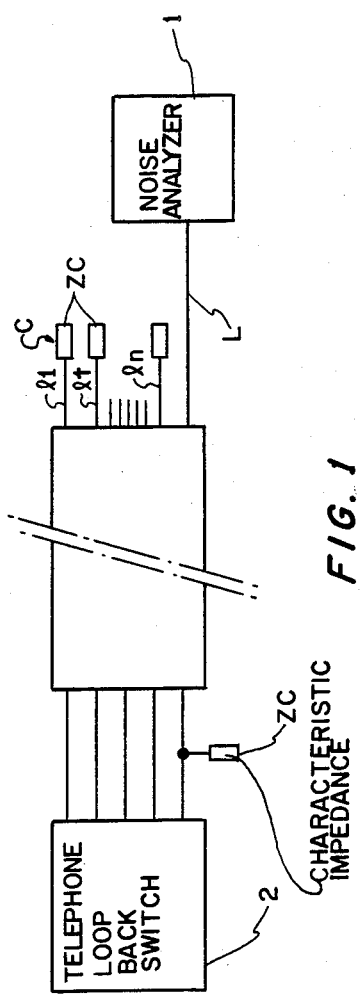
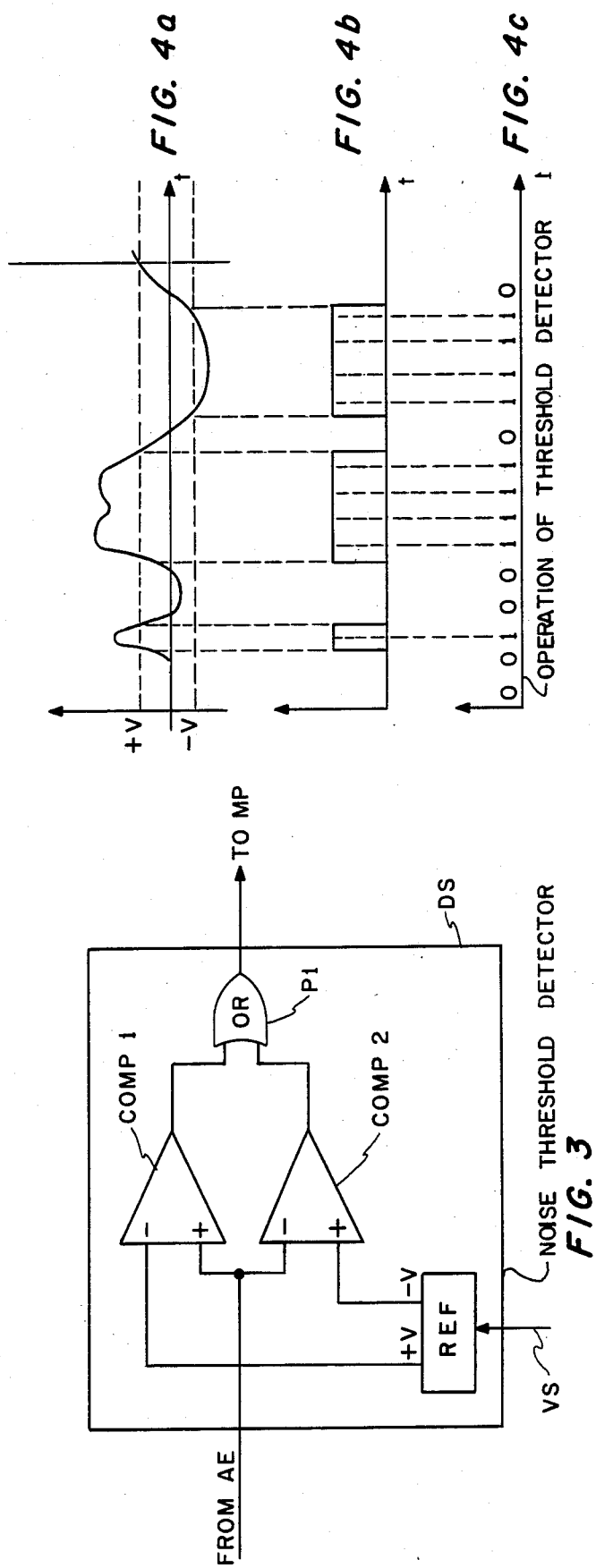

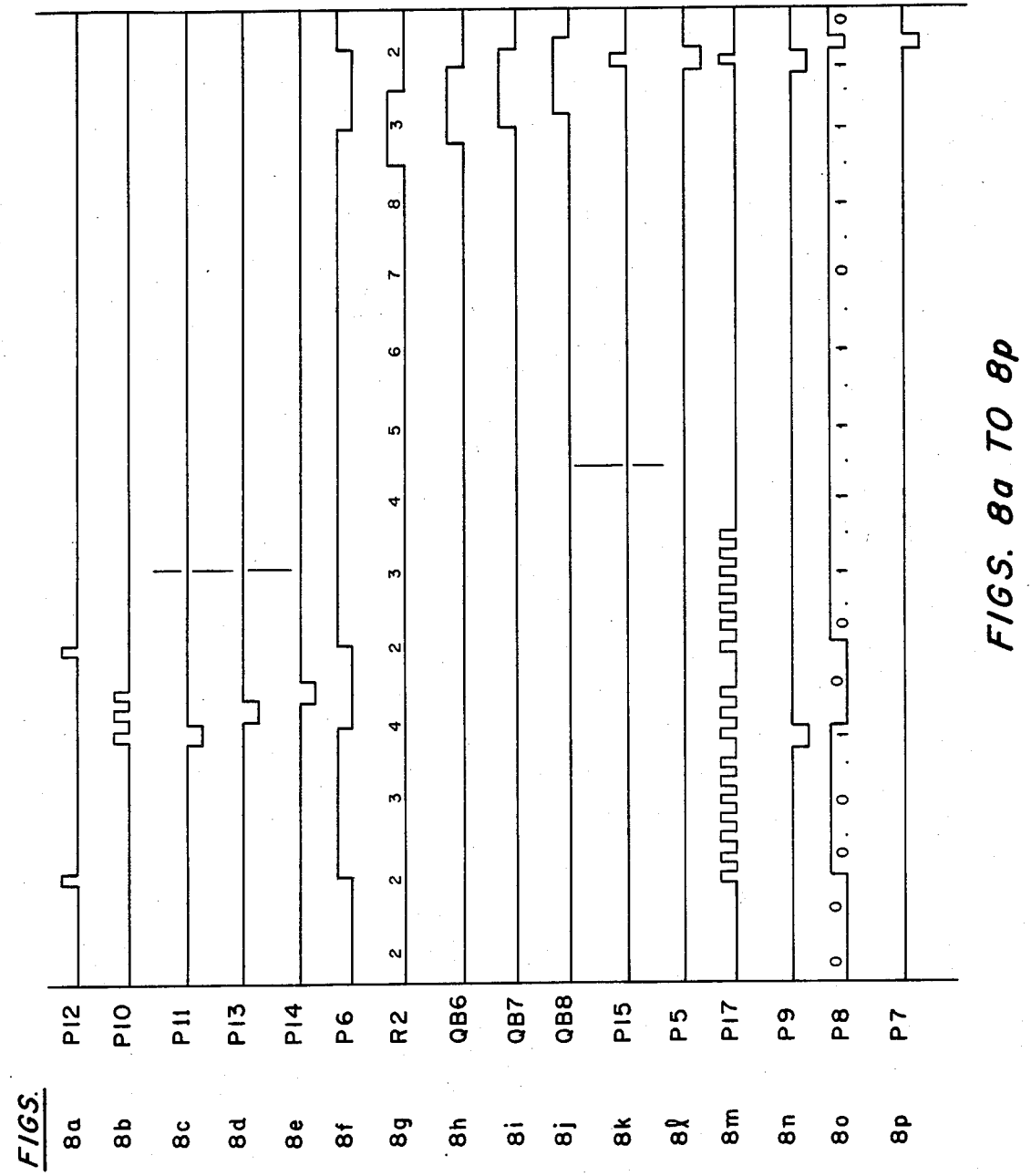

DIGITAL SIGNAL TRANSMISSION CABLE NOISE ANALYZER

The present invention relates to a digital signal transmission cable noise analyzer.

BACKGROUND OF THE INVENTION

Since the advent of PCM pulse transmission systems, an attempt has been made to use the existing network telephone cables to transmit a given number of communications. It then became essential to know certain characteristics of these cables, such as the impedance, the attenuation of pairs, the cross-talk between pairs for frequencies approaching the Nyquist value.

In particular, in order to determine the percentage of pairs that could be used in a cable, we have proceeded to systematic measurement of near-end and far-end cross-talk attenuation.

The article entitled "Mesure en régime numérique de la diaphonie sur des caâbles àpaires symmétriques" by J. Boulvin, published in the French technical journal "Commutation et Transmission", 29$^e$A., n$^o$2, April 1975, pp. 194–208 describes two types of measurements: one using a disturbing generator with sinusoids of variable frequency, the other in which random digital sequences are used.

In accordance with the above mentioned aritcle, we transmit digital pseudo-random sequences, simultaneously on a number of disturbing pairs and we measure the effective noise voltage received by a receiver connected at one end of a pair being observed. This measurement receiver is made up of a correcting amplifier similar to that of a regenerating repeater. The output of the correcting amplifier is connected to a wide band rms voltmeter.

In practice, the measuring instrument described in the above mentioned article can be used in particular to test special symmetric pair cables used only for 8.448 Mbit/s digital transmission systems. In these cables which are used only for digital transmission, the principal source of noise is effectively cross-talk whose effect is equivalent to, with sufficient precision, the superposition of a Gaussian noise on the useful signal. Furthermore, since these cables are provided for heavy traffic, the Gaussian noise is practically stationary.

The introduction of telematics now faces challenges that occur mainly due to certain limitations of the existing telephone networks. Concerning this subject, we can refer to the French technical journal "L'écho des recherches", n$^o$. 111 of the first trimester 1983, which was dedicated to the presentation of a "network integrating telephone and data", called RITD network. In this future network, we will use subscriber telephone cable pairs to transmit data corresponding to rates that could reach 2.048 Mbit/s. Within the same cable, in proximity to the digital transmission pairs, subsist pairs responsible for analog telephone traffic. We know that conventional analog communication signals generate disturbance of an impluse noise nature, such that the measurement time described in the above mentioned article, which is sufficient for a stationary Gaussian noise, is no longer adequate.

SUMMARY OF THE INVENTION

One object of the present invention consists in providing a noise analyzer which is capable of processing impulse noise as well as Gaussian noise.

In accordance with one characteristic of the invention, there is provided an analyzer for the noise signals transmitted by a telephone pair from a telephone cable, the pair being connected to a digital transmission equalizer, the analyzer comprising a clock, a time base and a microprocessor, a random access data memory, a data write bus, a data read bus, an address bus, a two-level threshold detector, positive $+V$ and negative $-V$, a data packet forming circuit, a schedule data register, a frame unique word register, the threshold detector having its input connected to the output of the equalizer and its output connected to the input of the data packet forming circuit, the data outputs of the data packet forming circuit, of the unique word frame register and of the schedule data register being connected to the data write bus, the output of the address counter being connected to the address bus, the clock generating the rate frequency to the equalizer and to the data packet forming circuit, the data packet forming circuit comprising, on one hand, delimitation means to delimit into data packets the binary stream generated by the threshold detector such that each stream be considered as an unique packet as long as the train does not contain a predetermined number of zeros at the clock rate, a byte by byte binary packet data storing register, the time base comprising means to trigger at predetermined instants the writing into the random access data memory the contents of the schedule data register, of the storage register and of the frame unique word register, the time base comprising also an output connected to the incrementing input of an address counter and one output connected to the zero reset input of the storage register.

In accordance with another characteristic, there is provided an analyzer for the noise signals transmitted by a telephone pair from a telephone cable, the pair being connected to a digital transmission equalizer, the analyzer comprising a clock, a time base and a microprocessor with random access data memory, a data write bus, a data read bus, an address bus, a two-level threshold detector, positive $+V$ and negative $-V$, a data packet forming circuit, a schedule data register, a frame unique word register, the threshold detector having its input connected to the output of the equalizer and its output connected to the input of the data packet forming circuit, the data outputs of the data packet forming circuits, of the frame unique word register and of the schedule data register being connected to the data write bus, the output of the address counter being connected to the address bus, the clock generating a rate frequency to the equalizer and to the data packet forming circuit, the data packet forming circuit comprising a noise signal delimiting circuit and a noise signal storage register, the delimiting circuit comprising further a counter for the zero successive bits contained between two uninterrupted sequences of 1 bits and a comparator comparing the contents of the counter with a predetermined value, the output of the comparator enabling, when it detects an equality, an output connected to the enable input of the time base, which has outputs respectively connected to the write triggering control input of the schedule data register, to the noise signal storage register and to the frame unique word register, to the incrementing input of the address counter and to the zero reset input of the storage register.

In accordance with another characteristic, the storage register serially receives the data from a packet, is clocked by said rate frequency and is reset to zero either after transfer to the write bus of a data packet byte, or when the end of a packet is detected on the wire, the address counter being incremented at each transfer to the data write bus.

In accordance with another characteristic, at the beginning of a new packet, the address counter is initialized to a value stored at the last preceding transfer of the storage register to the data write bus.

In accordance with another characteristic, during each data packet write cycle, a number of bytes are also transferred to the data write bus equal to that of the schedule data as well as the frame unique word.

In accordance with another characteristic, the storage register is made up of a byte register connected to a buffer register, the byte register having its data input connected to the output of the analog/digital converter, its clock input receiving the rate frequency and its zero reset input connected to the corresponding output of the time base, the buffer register having its output connected to the data write bus and its read enable input connected to one output of the time base, the time base enabling, at each trigger, the following enable sequence: enable of its output to the microprocessor, enable of the output to the schedule data register for a number equal to the number of schedule data bytes, enable of the output to the buffer register after each byte received in the byte register and at the end of each noise signal, enabling of the output to the unique word register, enabling of the zero reset output of the byte register.

In accordance with another characteristic, the analyzer also comprises a peak measuring circuit whose signal input is connected to the output of the equalizer, the read control input is connected to the time base and the output is connected to the data write bus in order to transer the measured value at the end of each packet.

In accordance with another characteristic, the time base enables the read control input of the peak measuring circuit immediately after the read control input from the frame unique word register.

In accordance with another characteristic, the threshold detector comprises a supply circuit generating the positive $+V$ and the negative $-V'$ threshold voltages and a memory connected to the said supply voltages and to which the absolute values V and V' are transmitted from the microprocessor. The absolute values V and V' may be equal or different.

In accordance with another characteristic, the preset number of zeros of the delimiter circuit is contained in a register whose content is transmitted by the microprocessor.

In accordance with another characteristic, the microprocessor is connected to a mass memory in which is transmitted, between two noise signals, the noise signal data read from the random access memory by the data read bus.

BRIEF DESCRIPTION OF THE DRAWINGS

The above mentioned as well as other characteristics of the invention, will become clearer upon reading the following description of an embodiment, the said description being carried out in relation to the attached drawings, among which:

FIG. 1 is a general block diagram illustrating the use of the analyzer mentioned in the invention, FIG. 3 is a schematic of the noise threshold detector for the analyzer of FIG. 2, FIGS. 4a to 4c are diagrams illustrating the operation of the noise detector of FIG. 3.

DESCRIPTION OF THE PREFERRED EMBODIMENT

The block diagram of FIG. 1 illustrates an analyzer 1 connected to a telephone pair L which is part of a telephone cable C to be tested. The other pairs 11 to 1n of cable C are shown, on one hand, to a telephone loopback switch 2 and, on the other hand, terminated by characteristic impedances Zc. The other end of pair L, with respect to the one connected to the analyzer 1, is shown terminated on its own characteristic impedance Zc.

The setup of FIG. 1 allows, within the analyzer, measurements on a cable which is already connected to a loopback switch, this in practice being a common case, because it provides an appreciation for the disturbances due to the loopback switch. However, the analyzer is not limited to this type of disturbance. It could also be used with a non-loopbacked cable whose other pairs would not be terminated on the Zc impedances. We can thus analyze the interferences due to noise outside the network caused by electrical power distribution network, electrical machines, relatively low frequency broadcast waves. In fact, as we shall see below, the analyzer, in accordance with the invention, allows the analysis of Gaussian or non-Guassian, stationary or non-stationary noise signals.

Figure 2:
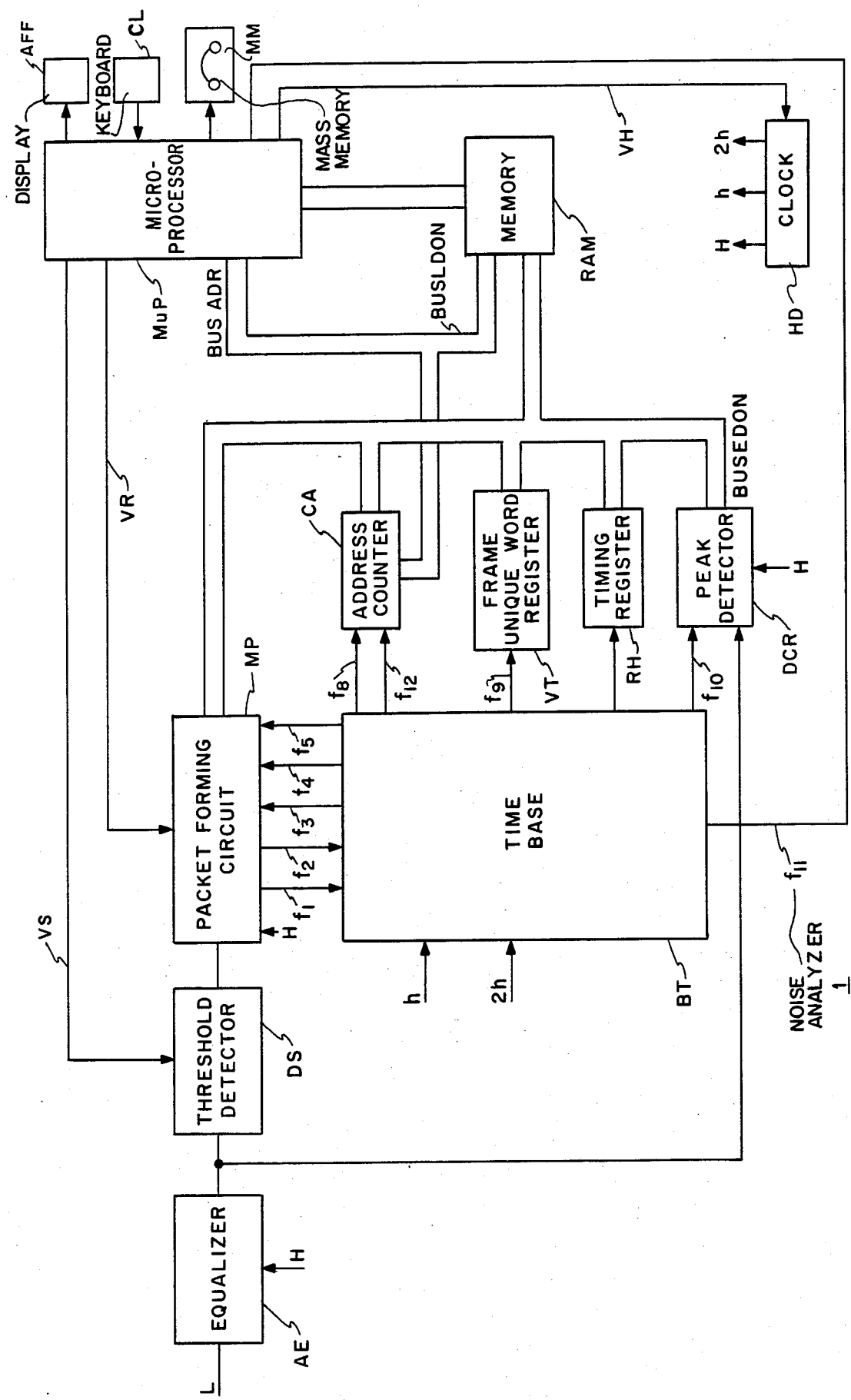
FIG. 2 is a block diagram of the analyzer of FIG. 1.

The analyzer 1 of FIG. 2 essentially comprises an equalizing amplifier AE, a threshold detector DS, a packet forming circuit MP, a peak detector DCR, a time base BT, a microprocessor MuP, a random access memory RAM, an address counter CA and a clock HD. The signal inputs of detectors DS and DCR are connected to the output of equalizer AE. The output of threshold detector DS is connected to the signal input of circuit MP. The time base BT has its outputs connected to the other circuits of the analyzer.

The analyzer 1 is completed by a frame unique word register VT and an hour register RH. A conventional display apparatus Aff and keyboard CL are associated with the microprocessor MuP.

A data write bust BUSEDON is provided between on one hand, the RAM memory and, on the other hand, the MP, VT, DCR, RA and CA circuits. The microprocessor MuP is connected to the RAM memory by a data read bus BUSLDON, and by an address bus BUSADR. The output of address counter CA is also connected to address bus BUSADR. Finally, the microprocessor MuP is connected to a mass memory MM.

The clock HD generates, on one hand, signals at the bit rate frequency H which are used in the equalizer AE, the packet forming circuit MP and the peak detector DCR and, on the other hand, high frequency signals h, for example at 2 MHz, and 2 h which are used in the time base BT. The bit rate frequency H is, preferrable variable and set from the microprocessor MuP, to which the clock HD is connected through wire VH.

The time base BT comprises read control outputs destined to the MP, VT, DCR, RH and CA circuits.

The noise threshold detector DS of FIG. 3 comprises two comparators made up by two differential amplifiers COMP1 and COMP2. The comparator COMP1 has one input connected to a +V voltage source and its other input connected to the equalizer AE while comparator COMP2 has one input connected to the output of equalizer AE and its other input connected to a −V voltage. The outputs of comparators COMP1 and COMP2 are respectively connected to the two inputs of an OR gate P1 whose output generates the output signal of threshold detector DS. In practice, the +V and −V sources are output terminals from a reference REF supply circuit which has a control input connected to a wire VS. The REF circuit provides the capability to change the value of V in relation to the signal applied on VS.

The diagram of FIG. 4a illustrates the impulse noise signal generated by equalizer AE. The +V and −V threshold levels are indicated on this diagram. We may also provide the use of two threshold levels +V and −V' having different absolute values.

The diagram of FIG. 4b illustrates the shape of the signal at the output of OR gate P1. This output signal is made up of a sequence of rectangular shaped signals each of which corresponds to the time durations during which the amplitude of the signal of FIG. 4a was greater than +V or less than −V. The threshold levels +V and −V are set according to the values applied to the control input of REF circuit by the microprocessor MuP, through wire VS. In practice, the threshold levels +V and −V can be set between the limits +2.5 V and −2.5 V.

In FIG. 4c, the signal of FIG. 4b is shown sampled at the clock sampling rate H. In the example shown, the result of this sampling is the binary stream 001001111011110, the "1"'s corresponding to the times during which the noise impulse was greater than +V or −V and the "0"'s corresponding to the times during which the amplitude was between the two thresholds +V and −V. In the illustrated examples, a 0 bit interval occupies two basic time units and the other a single time basic time unit.

As we will see further in this description, the control input of the packet forming circuit MP allows, from the microprocessor MuP, through wire VR, to choose the maximum length in terms of the number of 0 bits beyond which two interrupted sequences of 1 bits are considered as being part of two successive error packets. In the example of FIG. 4c, it is apparent that, if the maximum length of an interval is one 0 bit, the first bit forms a single event and the two following sequences of 1 bits also make up a single event. If the maximum length is two 0 bits, the signal of FIG. 4 constitutes a single event between the first and last 1 bit.

Figure 5:
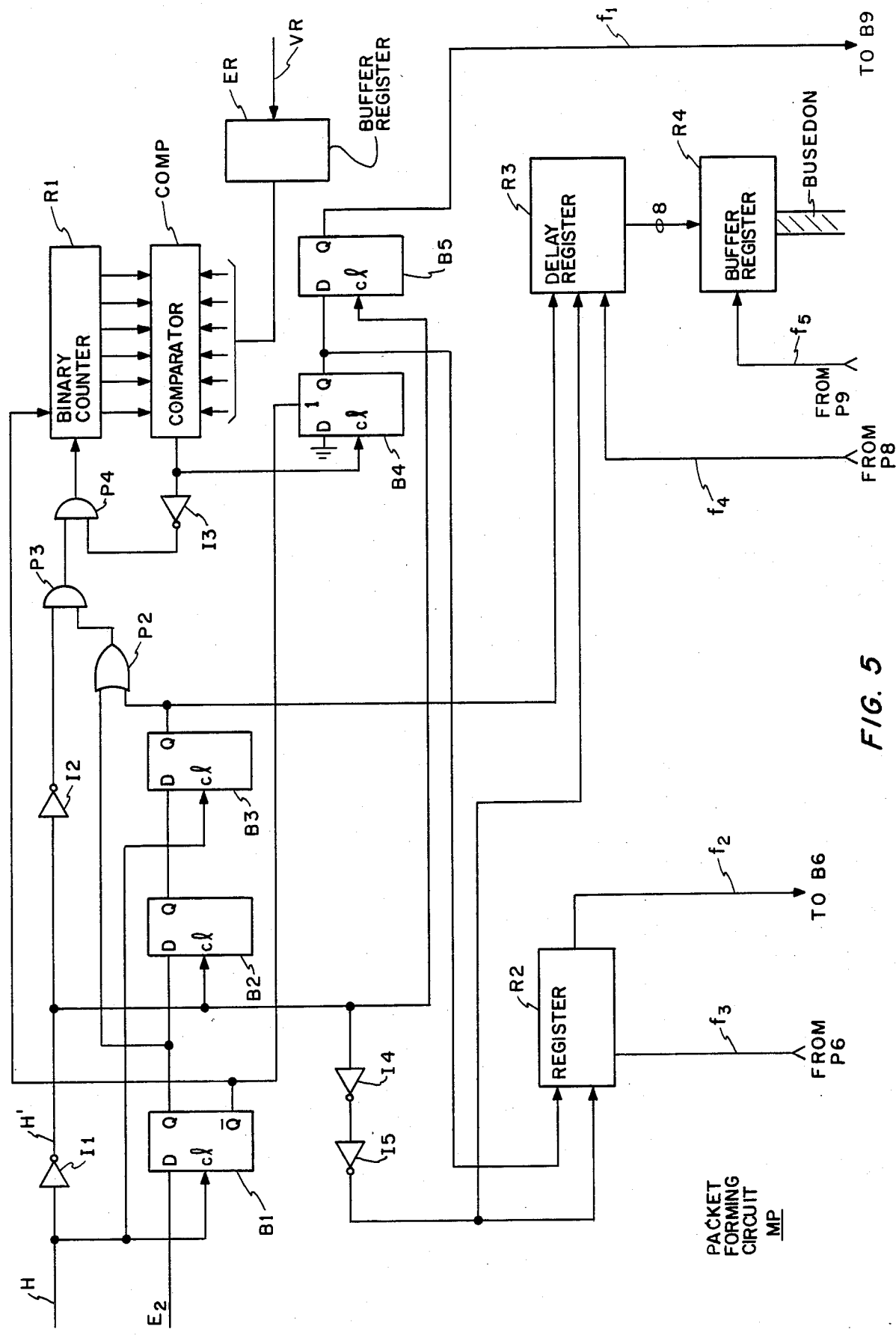
FIG. 5 is a schematic of the packet forming circuit for the analyzer of FIG. 2.

In the packet forming circuit MP of FIG. 5, the E2 input, to which is applied the output signal from OR gate P1 shown in FIG. 3 with the signal shape of FIG. 4, is connected to the data D input of a flip-flop B whose clock input C1 is connected to the rate input H. The Q output of flip-flop B1 is connected to the data D input of a flip-flop B2 whose clock input C1 is connected to the output of an inverter I1 whose input is connected to the H input. The I1 inverter generates the clock signal H'. The Q output of flip-flop B2 is connected to the D input of flip-flop B3 whose clock input is connected to the H input. The signals generated by the Q outputs of flip-flops B1, B2 and B3 are respectively designated QB1, QB2 and QB3.

The Q outputs of flip-flops B1 and B3 are connected to the two inputs of OR gate P2. The output of OR gate P2 is connected to one input of AND gate P3 whose second input is connected to the output of an inverter I2 whose input is connected to the output of inverter I1.

The output of AND gate P3 is connected to one input of AND gate P4 whose output is connected to the data input of a binary counter R1 whose outputs are connected to the corresponding first inputs of a binary comparator COMP3. The second inputs of comparator COMP3 are connected to the output of a buffer register ER whose input is connected to the microprocessor MuP by a wire VR. The output of comparator COMP3 is connected, on one hand, to the input of an inverter I3 whose output is connected to the second input of AND gate P4 and, on the other hand, to the clock input of a flip-flop B4. The zero reset input of counter R1 is connected to the Q output of flip-flop B1.

Flip-flop B4 has its D input connected to ground, its "1" setting input connected to the Q output of flip-flop B1 and its Q output connected to the D input of a flip-flop B5. The clock input of flip-flop B5 receives the H' signal and its output is connected by a wire f1 to the time base BT.

The Q output of flip-flop B4 is also connected to the validation input of a register R2 whose clock input receives the H' signal through the series of inverters I4 and I5. The register divides by eight and has its carry over output connected by a wire f2 to the time base BT. Its zero reset input is connected to the time base BT by a wire f3.

The Q output of flip-flop B3 is also connected to the data input of a delay register R3 whose clock input is connected to the output of inverter I5 and whose zero reset input is connected by a wire f4 to the time base BT. The eight parallel outputs of register R3 are connected to the inputs of a buffer register R4 whose contents is thus always the same as that of register R3. The outputs of register R4 are connected to the BUSEDON bus and its read input is connected by a wire f5 to the time base BT.

Figure 6:
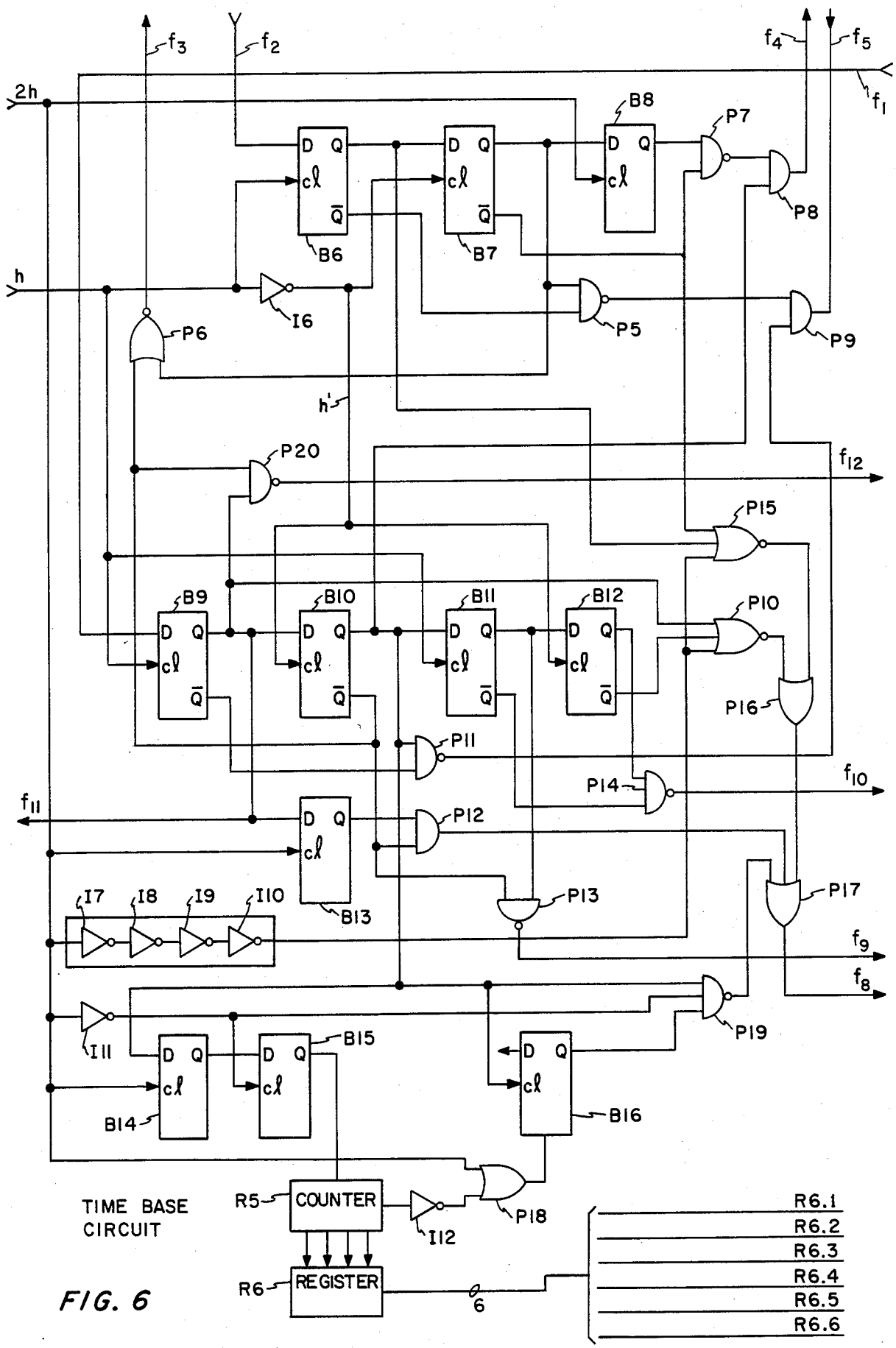
FIG. 6 is a schematic of the time base of the analyzer of FIG. 2, FIGS. 7a to 7x and 8a to 8p are diagrams illustrating the operation of the circuits of FIGS. 5 and 6.

In the time base BT, shown in FIG. 6, the wire f2 is connected to the D input of a flip-flop B6 whose C1 input receives the clock signal h and whose Q output is connected to the D input of a flip-flop B7. The clock input C1 of flip-flop B7 is connected to the output of an inverter I6 in order to receive the signal h' which is the complement of the signal h, and its Q output is connected to the D input of a flip-flop BB. The $\overline{Q}$ output of flip-flop B7 is also connected to an input of a NAND gate P5 whose second input is connected to the $\overline{Q}$ output of flip-flop B6. Finally, the Q output of flip-flop B7 is connected to one input of a NOR gate P6 whose output is connected to wire f3.

The Q output of flip-flop B8 is connected to an input of NAND gate P7 whose second input is connected to the $\overline{Q}$ output of flip-flop B7. The output of NAND gate P7 is connected to an input of AND gate P8 whose output is connected to wire f4, which transmits a zero reset signal to the delay register R3.

The f1 wire is connected to the D input of a flip-flop B9 whose clock input receives the h signal and whose $\overline{Q}$ output is connected, on one hand, to the D input of a flip-flop B10 and, on the other hand, to one input of the three input NOR gate P10.

The clock input of flip-flop B10 receives the h' signal from inverter I6 and has its Q output connected to the D input of a flip-flop B11 whose clock input C1 receives the h signal. The Q output of flip-flop B1 is connected to the D input of a flip-flop B12 whose clock input receives the h' signal and whose $\overline{Q}$ Q output is connected to the second input of NOR gate P10.

The $\overline{Q}$ output of flip-flop B9 and the Q output of flip-flop B10 are also connected to the two inputs of a NAND gate P11 whose output is connected to the second input of AND gate P9 whose other input is connected to the output of NAND gate P5.

The $\overline{Q}$ output of flip-flop B9 is also connected to the D input of flip-flop B13 whose clock input receives the 2h signal and whose Q output is connected to one input of an AND gate P12. The $\overline{Q}$ ouput of flip-flop B10 is also connected, on one hand, the second input of NOR gate P6 and, on the other hand, to one input of NAND gate P13 whose second input is connected to the Q output of flip-flop B11. The $\overline{Q}$ output of flip-flop B11 and the Q output of flip-flop B12 are respectively connected to the two inputs of a NAND gate P14.

The third input of NOR gate P10 receives the 2h signal through a delay circuit made up of four inverters I7 to I10. Another three input NOR gate P15 has one input connected to the Q output of flip-flop B6, another input connected to the $\overline{Q}$ output of flip-flop B7 and the third input connected to the output of inverter I10. The outputs of gates P10 and P15 are respectively connected to the inputs of an OR gate P16 whose output is connected to the first input of a three input OR gate P17. The second input of OR gate P17 is connected to the output of AND gate P12 and its third input is connected to the output of a NAND gate P19. The output of OR gate P17 is connected to the incrementing input of address counter CA.

The output of NAND gate P13 is connected by a wire f9 to the read enable input of the frame unique word VT register and that of NAND gate P14 by a wire f10 to the read enable input of the peak detection circuit DCR.

The Q output of flip-flop B10 is connected to the D input of a flip-flop B14 whose clock input C1 receives the 2h signal. The Q output of flip-flop B14 is connected to the D input of a flip-flop B15 whose clock input C1 receives, through inverter I11, the signal 2h. The Q output of flip-flop B15 is connected to the input of a counter R5. The carry over output of counter R5 is connected, by an inverter I12, to an input of an OR gate P18 whose output is connected to the reset CLR input of a flip-flop B16 and whose other input receives the 2h signal. For flip-flop B16, the D input rs connected to the level "1" supply, the clock input C1 is connected to the Q output of flip-flop B10 and the Q output is connected to one input of an AND gate P19. The second input of gate P19 is connected to the Q output of flip-flop B10, the third receives the 2h signal through inverter I11, and the output is connected to the third input of gate p17.

The parallel outputs of counter R5 are connected to the inputs of a register R6 being comprised of six outputs R6.1 to R6.6.

The Q output of flip-flop B9 and the $\overline{Q}$ output of flip-flop B10 are also respectively connected to the two inputs of a NAND gate P20 whose output is connected by a wire f12 to one input of address counter CA.

The hour register RH is comprised of a first register which constantly keeps in storage the time and a buffer register to which the time is delivered each time that the packet forming circuit encounters the start of an event. The timing data contains six bytes, two for the hour, two for the minute and two for the second, the six byte being successively delivered to the data bus BUSEDON upon receiving in RH the R6.1 to R6.6 signals.

The references to wires f1 to f5 and f8 to f12 are shown in FIG. 2 to illustrate the connections between the different circuits.

Figures 7A, 7X:
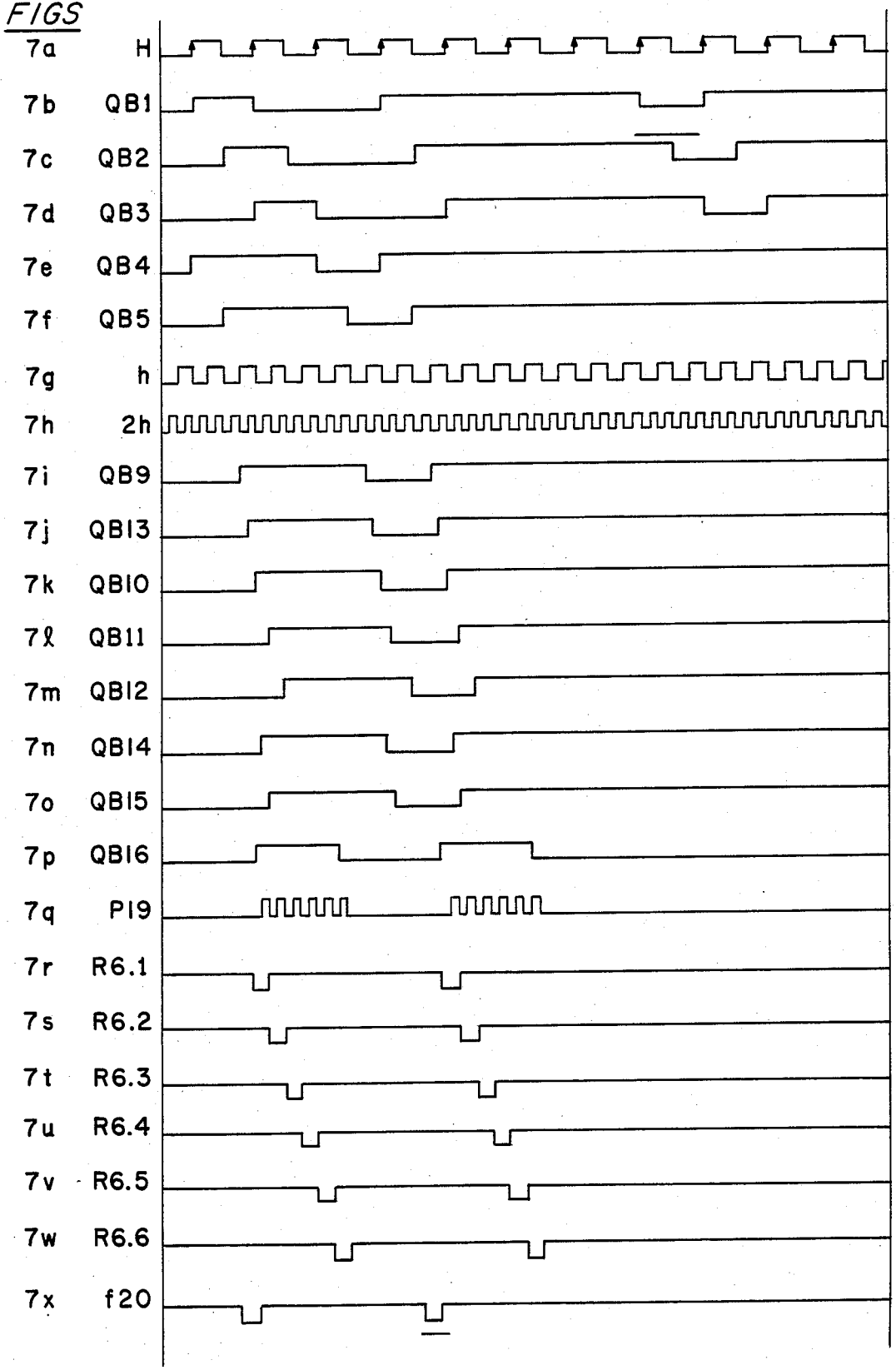

The FIGS. 7a to 7x and 8a to 8p illustrate the operation of the circuits of FIGS. 5 and 6. FIG. 7a illustrates the H signal whose complement H' can immediately be deducted. In other regards, we assume that the signal of FIG. 4b which is applied to the input E2 corresponds to the binary stream 0100111101111 . . . The Q output of flip-flop B1 generates this signal which is framed by the positive transition of the H signal. The FIGS. 7b to 7d represent the QB1, QB2 and QB3 signals at the Q outputs of flip-flops B1, B2 and B3, these signals being respectively delayed by one half period H. The FIGS. 7e and 7f represent the QB4 and QB5 signals at the Q outputs of flip-flops B4 and B5. In a more general manner in the description below, the QBn and $\overline{Q}$ Bn respectively represent the signals transmitted by the Q and $\overline{Q}$ outputs of gate Bn.

In the embodiment described, we assume that the content of buffer register ER is equal to 1, which means that the first "1" bit of the above mentioned stream constitutes by itself, a complete error signal since it is followed by two "0" bits. However, the single "0" bit between the four "1" bits and four "1" bits of the bit stream does not separate two error signals but is contained in it.

At the start of an error signal, the Q output of flip-flop B4 goes to the 1 level upon receiving a negative transition on its one setting input which is connected to the $\overline{Q}$ output of flip-flop B1. The Q output of flip-flop B4 returns to the 0 level when comparator COMP3 goes to the 1 level, that is when counter R1 has received from AND gate P4 one pulse corresponding to the transmission of two consecutive "0" bits generated by the Q output of flip-flop B1. Thus, the QB4 signal (or the QB5 signal to within one time delay) defines the start and end of each error signal.

FIGS. 7g and 7h illustrate the clock signals h and 2h. We assume that the frequency of signal H is 1 MHz and that of signal h is 2 MHz in the example described.

The FIGS. 7i to 7p respectively represent the signals QB9, QB13, QB10, QB11, QB12, QB14, QB15 and QB16 at the Q outputs of flip-flops B9, B13, B10, B11, B12, B14, B15 and B16. All the signals QB9 to QB16 have the same shape as signal QB5, but they are time delayed in such a way as to create timing signals with logic gates.

FIG. 7x illustrates the output signal of NAND gate P20 which allows the introduction of the last stored write address to the input of the address counter CA.

Thus, the signals $\overline{QB10}$ and QB13 are combined in AND gate P12 whose output signal is transmitted by a wire f8, through OR gate P17, in order to enable the initialization of the address counter to the address introduced to it. The signal QB10 is used, through flip-flops B14 and B15, to trigger counter R5 which causes through gate P19 the transmission of the pulses shown in FIG. 7q which are transmitted by wire f8 to the address counter to increment the address six times during the transmission of the six timing bytes. In other respects, FIGS. 7r to 7w respectively illustrate the signals transmitted by the outputs R6.1 to R6.5 of register R6, these signals triggering in the timing buffer the transmission of bytes on bus BUSEDON.

In other regards, the wire f11 which transmits the signal QB9 is connected to a microprocessor MuP to indicate to it the start of an error packet.

FIG. 8c illustrates the output signal of NAND gate P11 which combines the signals $\overline{QB9}$ and QB10. The signal from gate P11 is transmitted by gate P9 and a wire f5 to buffer register R4 to give it the command to transfer the last byte of the event to data bus BUSEDON. Simultaneously, through gates P10, P16 and P17, the address counter CA is incremented. FIG. 8b illustrates the output signals of gate P10. It is apparent that the signals of gate P10 can only be transmitted when QB9 is at a zero level, which means that the error packet is finished.

The output signal of gate P13, shown in FIG. 8d, is the combination of the signals QB10 and QB11 and it is transmitted to the frame locking circuit VT throught wire f9 to command this one to transmit its contents to data bus BUSEDON. Simultaneously, the second last pulse of P10 is transmitted to increment address counter CA.

The output signal of gate P14, shown in FIG. 8e is the combination of signals $\overline{Q11}$ and QB12 and is used, through wire f10 to trigger within the peak detector the transfer of the peak value on the data bus BUSEDON.

FIG. 8f illustrates the output signal of NOR gate P6 which combines the signals $\overline{QB10}$ and QB7 to reset to zero counter R2, either through $\overline{QB10}$ when the event has lasted less than eight periods of H, or through QB7 when counter R6 overflowed. FIG. 8g illustrates the output carry state for counter R2. FIGS. 8h to 8j illustrate the time delayed signals QB6, QB7 and QB8 which go to the 1 level only when counter R2 has overflowed.

FIG. 8k illustrates the output signal of NOR gate P15, which combines the signals QB6, $\overline{QB7}$ and 2h and which is used, through wire f8 to increment the address counter CA in order to place into memory the first event byte stored in register R4. FIG. 8 illustrates the output signal of gate P5 which combines the signal $\overline{QB6}$ and QB7 to give the command to register R4 to transfer the byte it contains onto the data bus BUSEDON.

FIG. 8m illustrates the pulses which are transmitted to address counter CA on wire f8, that is the logical sum of the input signals to P17.

FIG. 8n illustrates the output signals of gate P9 which combines the output signals of gates P5 and P11 and which is connected to the transfer enable input of register R4.

FIG. 8o illstrates the output signal of gate P8 which combines the signals $\overline{QB7}$, QB8 and QB10 to reset to zero register R3. FIG. 8p illustrates the output signal of gate P7 which combines the signals $\overline{QBT}$ and QB8 for gate P8.

It is clear by observing FIGS. 8a and 7q that the starts of the two event or error signals present in the digital stream ... 00100111101111 ... trigger the same effects: a pulse at the output of P12 and six pulses at the output of P19. However, since the first event is comprised of only one bit, the counter R2 will not overflow, it is thus necessary to trigger, immediately at the end of this event, as shown in FIGS. 8b to 8e, the successive reading of the data written in R4, the reading of the frame unique word VT and the reading of the byte written in the peak detector DCR. However, in the second event which lasts less than nine bits, as illustrated in FIGS. 8k and 8i, it is necessary, when register R2 has counted up to 8, to trigger the reading of the byte written in the buffer register R4 and to reset the write buffer R3 to zero. At the end of the second event we will have the pulses shown in FIGS. 8b to 8e.

We claim:

1. An analyzer for noise signals transmitted by a telephone pair in a telephone cable, said pair being connected to a digital transmission equalizer, the analyzer comprising a clock, a time base circuit, a microprocessor and a circuit for controlling said microprocessor, a random access memory, a data write bus, an address bus, said busses interconnecting said clock, time base circuit, microprocessor and said random access memory; a positive (+V) and negative (−V) threshold detector, a packet forming circuit, a schedule data register, a frame unique word register, the threshold detector having its input connected to the output of said equalizer and its output connected to the input of the packet forming circuit, the data outputs of the packet forming circuit of the frame unique word register and of the schedule data register being connected to the data write bus, an address counter having an incrementing input and an output connected to the address bus, the clock generating a rate frequency which is applied to the equalizer and to the packet forming circuit; the packet forming circuit comprising, on one hand, delimiting means to delimit into data packets the binary stream generated by the threshold detector such that each stream is considered as a unique packet as long as the stream is not comprised at a particular rate and with a predetermined number of zeros; said packet forming circuit including a byte by byte packet data storage register; said time base circuit comprising means for triggering at predetermined instants the writing into the random access data memory of the contents of the schedule data register, of the storage register and of the frame unique word register; the time base circuit also comprising an output connected to the incrementing input of said address counter and an output connected to a zero reset input of the storage register.

2. An analyzer for noise signals transmitted by a telephone pair in a telephone cable, said pair being connected to a digital transmission equalizer, the analyzer comprising a clock, a time base circuit and a microprocessor with a random access data memory, a data write bus, a data read bus, and an address bus, said busses interconnecting said clock, time base circuit and microprocessor, said equalizer also comprising a two-level, positive (+V) and negative (−V) threshold detector, a data packet forming circuit, a schedule data register, a unique frame word register, the threshold detector having its input connected to the output of equalizer and its output connected to the input of the packet forming circuit, the data outputs of the packet forming circuit of the frame unique word register, and of the schedule data register being connected to the data write bus, an address counter having an output connected to the address bus, the clock generating a train of pulses setting a rate frequency for said equalizer and for the packet forming circuit, the packet forming circuit including a noise signal delimiting circuit and a noise signal storage register, the delimiting circuit also comprising a counter for counting the number of successive zero bits contained between two sequences of uninterrupted logical 1 bits, and a comparator for comparing the contents of said counter with a predetermined value, the comparator having an output responsive to a detection of equality for enabling an output connected to the enable input of the time base circuit, an output of said time base circuit being respectively connected to the write enable trigger inputs of the schedule data register, of the noise signal storage register and of the frame unique word register, the output of the time base circuit also being connected to the incrementing input of the address counter and to a zero reset input of the storage register.

3. The analyzer in accordance with claim 1 or 2, wherein the storage register is coupled to serially received data from a packet at a clocked rate frequency and said storage register being reset to zero, either after transfer of a byte from the packet to the data write bus, or when the end of a packet is detected, the address counter being incremented at each transfer of data to the data write bus.

4. The analyzer in accordance with claims 1 or 2 wherein at the start of each new packet, the address counter is initialized to a value which was stored at the end of the last preceding transfer of data from the storage register to the write data bus.

5. The analyzer in accordance with claims 1 or 2 wherein during each packet write cycle, a number of bytes equal to a schedule of data and the frame unique word are transferred to the data write bus.

6. The analyzer in accordance with claims 1 or 2, wherein the storage register comprises a byte register connected to a buffer register, the byte register having a data input connected to an output of an analog-to-digital converter, said byte register having a clock input for receiving the clocked rate frequency and also having a zero reset input connected to a corresponding output of the time base clock, the buffer register having an output connected to the data write bus and also having a write enable input connected to one output of the time base circuit, the time base circuit enabling, at each of a series of triggerings, the following enable sequence: an enabling of its output to the microprocessor, an enabling of the output to the schedule data register for a number equal to the number of data bytes, an enabling of the output to the buffer register after each byte is received in the byte register and at the end of each signal, an enabling of the output to the frame unique word register, and an enabling of the zero reset output of the byte register.

7. The analyzer in accordance with claims 1 or 2 wherein said analyzer also comprised of a peak measurement circuit having an input which is connected to the output of the equalizer, the peak measurement circuit having a read enable input which is connected to the time base circuit and an output which is connected to the data write bus in order to transfer the measured value of data at the end of each packet.

8. The analyzer in accordance with claim 7, wherein the time base circuit activates the read enable input of the peak measurement circuit immediately after an input of a read enable command from the frame unique word register.

9. The analyzer in accordance with claims 1 or 2 wherein the threshold detector is comprised of a supply circuit for generating the threshold voltages $+V$ and $-V$ and a memory circuit connected to said supply circuit and to which the absolute values $+V$ and $-V$ are transmitted by the microprocessor.

10. The analyzer in accordance with claim 9, wherein the absolute values $+V$ and $-V$ are equal.

11. The analyzer in accordance with claims 1 or 2 wherein the predetermined value for the number of zeros of the delimiting circuit is contained in a register having a content which is transmitted by the microprocessor.

12. The analyzer in accordance with claims 1 or 2 wherein the microprocessor is connected via the data read bus to a bulk memory circuit to which it transfers, between two noise signals, the noise signal data which is read from the random access memory.

13. The analyzer in accordance with claim 9, wherein the absolute values $+V$ and $-V$ are different.

* * * * *